No. 790,972.

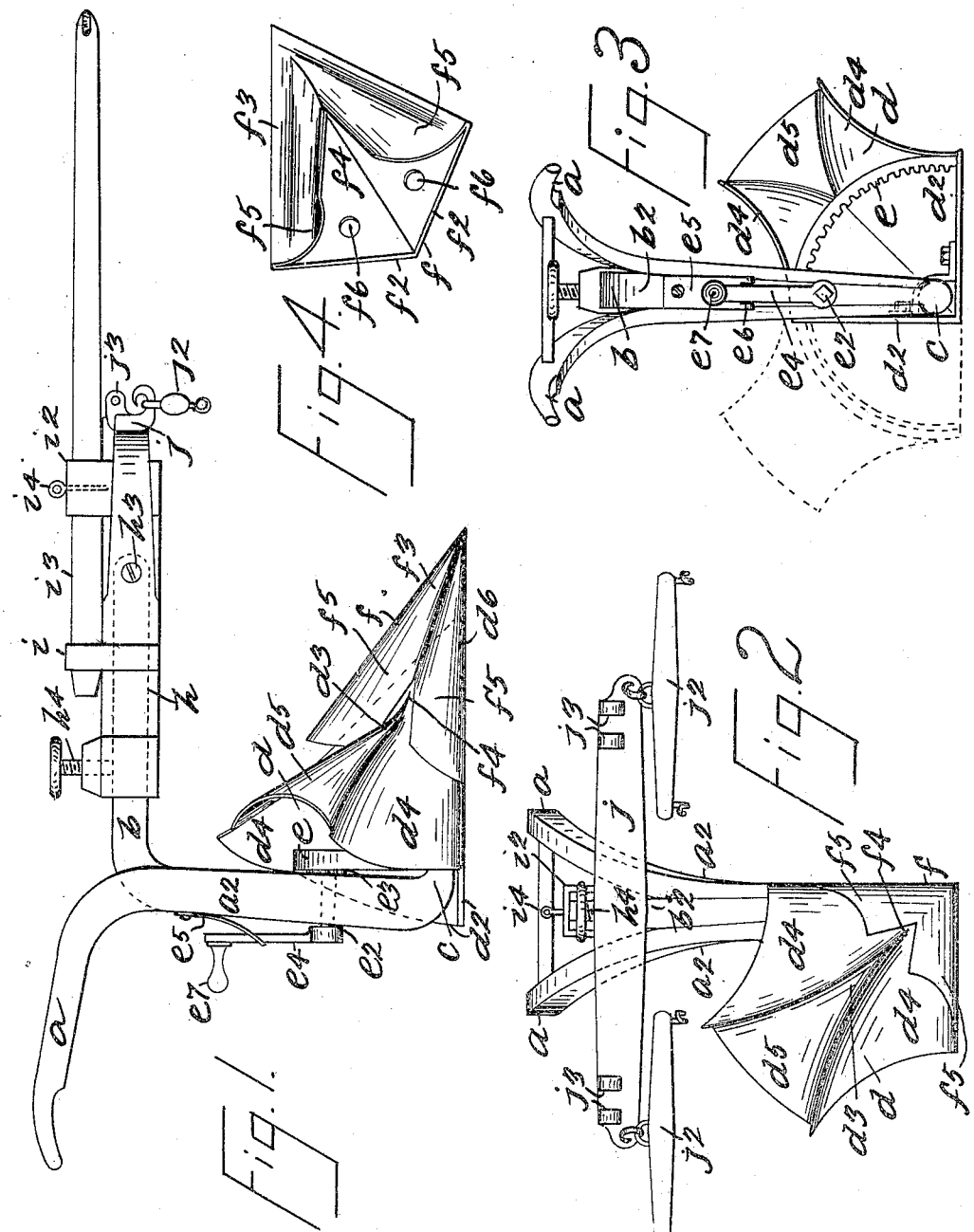

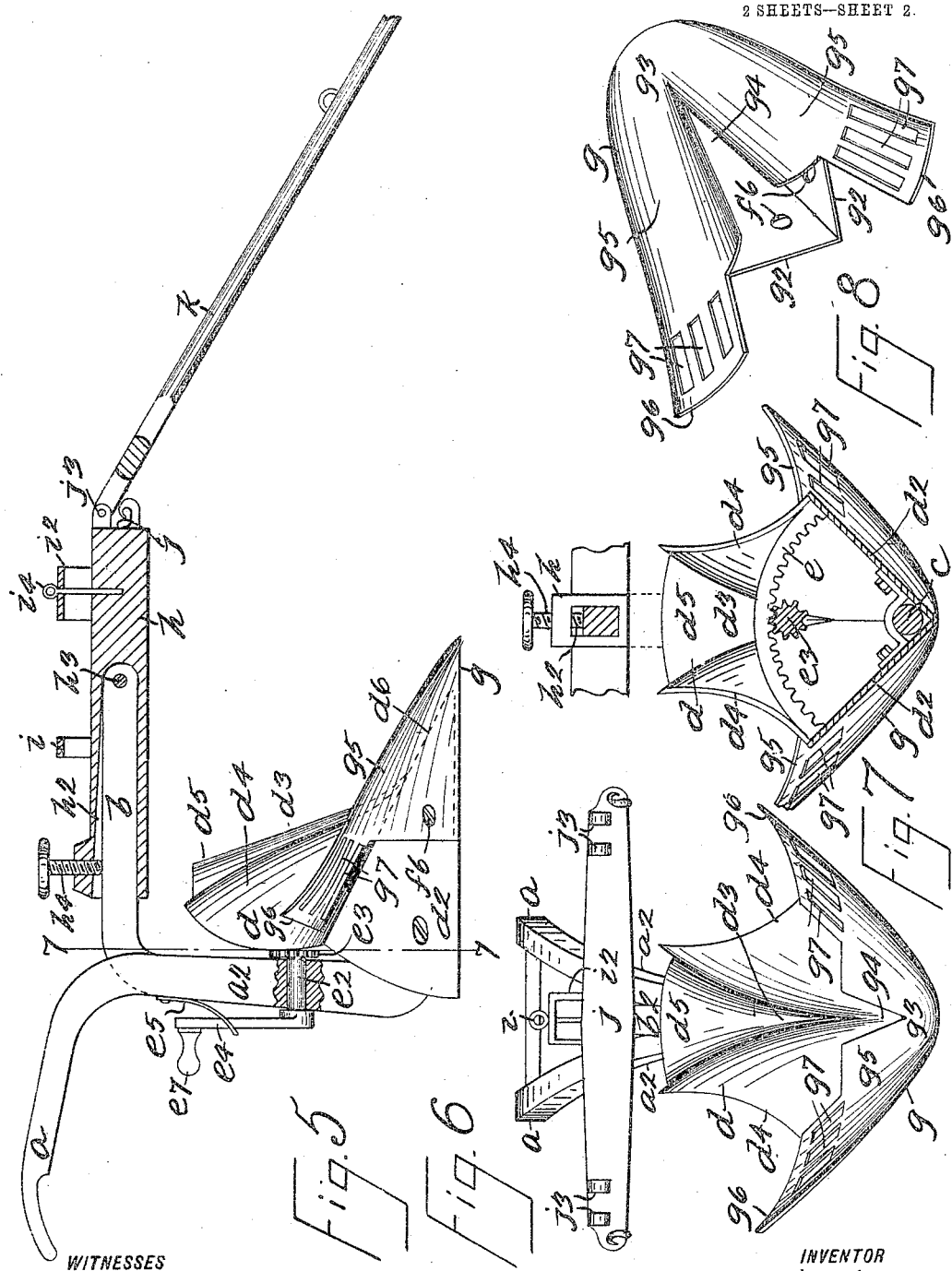

Patented May 30, 1905.

UNITED STATES PATENT OFFICE.

FRANCIS NOGUES, OF NEW YORK, N. Y., ASSIGNOR OF ONE-HALF TO BIRT MORERE, OF NEW YORK, N. Y.

PLOW.

SPECIFICATION forming part of Letters Patent No. 790,972, dated May 30, 1905.

Application filed November 15, 1904. Serial No. 232,782.

*To all whom it may concern:*

Be it known that I, FRANCIS NOGUES, a citizen of the United States, residing at New York, in the county of New York and State of New York, have invented certain new and useful Improvements in Plows, of which the following is a specification, such as will enable those skilled in the art to which it appertains to make and use the same.

This invention relates to plows; and the object thereof is to provide an improved plow having a double and pivoted moldboard which may be swung from one side to the other, whereby a field may be broken up or plowed by driving back and forth therethrough at the opposite sides of an original furrow without driving around a "land," a further object being to provide a plow having a double and turnable moldboard provided with a detachable nose-piece, said nose-piece being of different forms, according to the use to which it is desired to put the plow, a further object being to provide a plow of the class described which may also be conveniently used for digging potatoes, a further object being to provide a plow with improved means for adjusting the depth to which the nose of the moldboard will pass into the ground; and with these and other objects in view the invention consists in a plow constructed as hereinafter described and claimed.

The invention is fully disclosed in the following specification, of which the accompanying drawings form a part, in which the separate parts of my improvement are designated by suitable reference characters in each of the views, and in which—

Figure 1 is a side view of my improved plow, the moldboard thereof being provided with the regular plow-nose; Fig. 2, a front view of the plow as shown in Fig. 1; Fig. 3, a rear view and showing one position of the moldboard in full lines and the reversed position in dotted lines; Fig. 4, a perspective view of the detachable nose-piece as shown in Figs. 1 and 2; Fig. 5, a view similar to Fig. 1, but showing the form of nose-piece used in digging potatoes and showing the moldboard in the position into which it is turned for the purpose of digging potatoes; Fig. 6, a front view of the plow as shown in Fig. 5; Fig. 7, a section on the line 7 7 of Fig. 5, and Fig. 8 a perspective view of the nose-piece for digging potatoes and shown in Figs. 5 and 6 attached to the plow or the moldboard thereof.

The framework of my improved plow consists of the handle-arms $a$, provided with downwardly-directed shanks $a^2$, together with the beam $b$, having a downwardly-directed shank $b^2$, which is secured between the shanks $a^2$ of the handle-arms $a$, and at the lower ends of the shanks $a^2$ and $b^2$ of the handle-arms $a$ and beam $b$ is a forwardly-directed pivot member $c$, (shown in section in Fig. 7,) which extends parallel, or substantially so, with the beam $b$, and the pivot member $c$ may be formed integrally with the lower end of the shank $b^2$ of the beam $b$, or said pivot member may be secured to the lower ends of the shanks $a^2$ of the handle-arms $a$ or to the lower ends of the shank $b^2$ and the shanks $a^2$, as may be desired.

The main moldboard $d$ is of the form shown in Figs. 1, 2, 3, 5, 6, and 7, and it consists of two plates or side members $d^2$, connected at an angle of ninety degrees and tapered forwardly to a point and connected at their free edges by the main moldboard proper, which consists of a part or plate $d^3$, which is also tapered forwardly to a point, the central portion of which is raised or extended outwardly and backwardly at its rear end to form two side members $d^4$, which are longitudinally concaved and between which is a central raised convex portion $d^5$, the parts $d^4$ and $d^5$ being also tapered forwardly to a point, and the general form of the moldboard thus formed in cross-section is shown in Fig. 7, the bottom portion thereof being triangular in cross-section, and the plates or parts $d^2$, which form the base portion of the moldboard, are also connected at their free edges and at the rear ends thereof by a segmental gear $e$, arranged in a vertical plane.

The shanks $a^2$ of the arms $a$ and the shank $b^2$ of the beam $b$ form an upright frame portion, and mounted therein between the pivotal support of the moldboard at $c$ and the beam $b$ is a crank-shaft $e^2$, which ranges forwardly and backwardly and the inner end of which is provided with a pinion or gear $e^3$, which operates in connection with the segmental gear $e$, and the outer end of the shaft $e^2$ is provided with a crank $e^4$, and secured to the upright frame portion above the shaft $e^2$ is a spring $e^5$, the lower end of which bears on the crank $e^4$ and is provided with a notch or recess $e^6$, adapted to receive said crank, and said crank is provided with a handle $e^7$. The spring $e^5$ will hold the crank $e^4$ in an upright position at all times, and, supposing the moldboard to be in the position shown in full lines in Fig. 3, by pressing backwardly the spring $e^5$ and turning the crank $e^4$ to the left through two complete revolutions the moldboard will be turned into the opposite position, as shown in dotted lines in said figure, and by reversing this operation the moldboard may be turned back into the position shown in full lines in said figure.

I also provide a detachable nose-piece $f$, which is shown detached in Fig. 4 and applied to the plow in Figs. 1 and 2, and this nose-piece is employed in ordinary plowing. The nose-piece $f$ consists of two side plates $f^2$, secured together at right angles to each other, and a front or top plate $f^3$, having a V-shaped recess or socket $f^4$ at the rear end thereof and longitudinal side grooves or concave surfaces $f^5$, and in practice the nose $d^6$ of the main moldboard (shown in dotted lines in Figs. 1 and 2) is inserted into the nose-piece $f$ or said nose-piece is passed on over said nose and is secured in place by screws or bolts passed through holes $f^6$ in the side plates $f^2$ thereof. It will be understood that one of the side plates $f^2$ always constitutes the bottom of the nose-piece, according to the position in which the plow is turned, and the plates $d^2$ of the main moldboard constitute the bottom of said moldboard, according to the position in which the latter is turned.

In Fig. 8 I have shown detached a nose-piece $g$, which is intended for use in digging potatoes, and this nose-piece is shown applied to the plow in Figs. 5, 6, and 7, and said nose-piece is composed of two plates $g^2$, connected at an angle of ninety degrees and connected at their free edges by a plate $g^3$, having a V-shaped recess or socket $g^4$ in its rear end, and the sides of which are provided with longitudinally grooved or concave surfaces $g^5$, and said sides are extended rearwardly, as shown at $g^6$, and provided with slots or openings $g^7$, any desired number of which may be employed, and said slots or openings may also be of any desired size. The nose-piece $g$ is secured on the nose $d^6$ of the main moldboard in the same manner as the nose-piece $f$, and in the use of the nose-piece $g$ for the purpose of digging potatoes the main moldboard is turned by means of the crank $e^4$, so that the angle of the moldboard formed by the plates $d^2$ thereof and the plates $g^2$ of the nose-piece $g$ will rest directly on the ground and the side members or wings of the nose-piece will project from the opposite sides of the main moldboard, the position of these parts being shown in Fig. 7.

It will be understood that in the operation of digging potatoes the plow must be held in the position shown in Fig. 7, and in this operation the nose-piece $g$ passes under the potatoes and throws them out, and the potatoes and dirt pass backwardly over the sides of the nose-piece, and the dirt passes through the openings $g^7$ in the opposite side wings of the nose-piece, and the potatoes are thus separate from the dirt.

I also provide improved devices for hitching a horse or horses to the plow and for controlling the depth to which the nose of the plow will pass into the ground when ordinary plowing is desired. These devices consist of a supplemental beam member $h$, into the rear end of which the beam $b$ passes, the supplemental beam member $h$ being provided, in the form of construction shown, with a longitudinal recess $h^2$. The front end of the beam $b$ is pivoted in the supplemental beam member $h$ at $h^3$, and said supplemental beam member is adapted to swing to a slight extent in a vertical plane, and a screw $h^4$ is passed through the top rear end portion of the supplemental beam member and bears on the beam $b$ and is designed to regulate the movement in a vertical plane of the supplemental beam member.

I have shown different ways of hitching a horse or horses to my improved plow. One consists of keepers $i$ and $i^2$, connected with the supplemental beam member $h$, and into which an ordinary pole or tongue $i^3$ is passed and held in place by a pin $i^4$, passed downwardly therethrough and through the keeper $i^2$, and in connection with the pole or tongue $i^3$ I employ a doubletree $j$, having swingletrees $j^2$ connected therewith, and it will be understood that the tongue or pole $i^3$ is employed when two horses are hitched to the plow. Instead of employing the tongue $i^3$ and the swingletrees $j^2$ I may employ an ordinary pair of shafts $k$ for single horses, and the doubletree $j$ is provided near its opposite ends with the usual keepers $j^3$ or similar devices whereby the shafts $k$ are connected therewith. My invention, however, is not limited in any way to the method of hitching a horse or horses to a plow, and various changes in and modifications of these and other features of construction herein shown and described may be made without departing from the spirit of my invention or sacrificing its advantages.

Having fully described my invention, what I claim as new, and desire to secure by Letters Patent, is—

1. A plow provided with a rotatable moldboard, said moldboard being composed of two base plates or parts connected at an angle of ninety degrees and either of which is adapted to serve as the base of the moldboard, said plates being connected at their free edges by the moldboard proper which comprises inwardly-concaved side members connected at their free edges by a front or upper convex member, said base plates or parts and said side members and the upper or front convex member being all tapered forwardly, and means for rotating said moldboard and for locking it in three different positions, in two of which the base plates or parts rest flat on the ground, and in the other of which the angle formed by said base plates or parts rests on the ground, substantially as shown and described.

2. A plow provided with a rotatable moldboard, said moldboard being composed of two base plates or parts connected at an angle of ninety degrees and either of which is adapted to serve as the base of the moldboard, said plates being connected at their free edges by the moldboard proper which comprises inwardly-concaved side members connected at their free edges by a front or upper convex member, said base plates or parts and said side members and the upper or front convex member being all tapered forwardly, and means for rotating said moldboard and for locking it in three different positions, in two of which the base plates or parts rest flat on the ground, and in the other of which the angle formed by said base plates or parts rests on the ground, said moldboard being also provided with a detachable nose-piece, substantially as shown and described.

3. A plow provided with a rotatable moldboard, said moldboard being composed of two base plates or parts connected at an angle of ninety degrees and either of which is adapted to serve as the base of the moldboard, said plates being connected at their free edges by the moldboard proper which comprises inwardly-concaved side members connected at their free edges by a front or upper convex member, said base plates or parts and said side members and the upper or front convex member being all tapered forwardly, and means for rotating said moldboard and for locking it in three different positions, in two of which the base plates or parts rest flat on the ground, and in the other of which the angle formed by said base plates or parts rests on the ground, comprising a segmental gear connected with the rear corners of the base plates or parts and arranged in a vertical plane, a crank-shaft mounted in the framework of the plow and provided with a pinion which meshes with said segmental gear, a crank connected with said shaft, and a locking device for said crank, substantially as shown and described.

4. A plow provided with a double rotatable moldboard having two base plates or parts connected at an angle of ninety degrees, and means for rotating said moldboard and for locking it in three different positions, in two of which the base plates or parts rest directly on the ground, and in the other of which the angle formed by said base plates or parts rests directly on the ground, said moldboard being also provided with a detachable nose-piece, having backwardly-extended top side wings, substantially as shown and described.

In testimony that I claim the foregoing as my invention I have signed my name, in presence of the subscribing witnesses, this 12th day of November, 1904.

FRANCIS NOGUES.

Witnesses:
   C. E. MULREANY,
   C. J. KLEIN.